(12) United States Patent
Cohen et al.

(10) Patent No.: US 9,812,026 B2
(45) Date of Patent: Nov. 7, 2017

(54) CONSTRUCTED RESPONSE SCORING MECHANISM

(75) Inventors: Jon D. Cohen, Washington, DC (US); Joseph L. Dvorak, Hampshire, IL (US); Larry E. Albright, Alexandria, VA (US); Walid S. Saba, Dunn Loring, VA (US)

(73) Assignee: AMERICAN INSTITUTES FOR RESEARCH, Washington, DC (US)

( * ) Notice: Subject to any disclaimer, the term of this patent is extended or adjusted under 35 U.S.C. 154(b) by 1133 days.

(21) Appl. No.: 12/320,631

(22) Filed: Jan. 30, 2009
(Under 37 CFR 1.47)

(65) Prior Publication Data

US 2010/0120010 A1    May 13, 2010

Related U.S. Application Data

(60) Provisional application No. 61/193,252, filed on Nov. 12, 2008.

(51) Int. Cl.
*G09B 3/00* (2006.01)
*G09B 7/02* (2006.01)

(52) U.S. Cl.
CPC .................................... *G09B 7/02* (2013.01)

(58) Field of Classification Search
USPC ................................................ 434/322, 323
See application file for complete search history.

(56) References Cited

U.S. PATENT DOCUMENTS

| 6,120,299 A | 9/2000 | Trenholm et al. |
| 2007/0105084 A1 | 5/2007 | Kuntz et al. |
| 2007/0218450 A1 | 9/2007 | Macclay et al. |

OTHER PUBLICATIONS

International Search Report, dated Mar. 24, 2009, WIPO.
International Preliminary Report on Patentability, dated May 26, 2011, International Application No. PCT/US2009/006066.

*Primary Examiner* — Kesha Frisby
(74) *Attorney, Agent, or Firm* — Steptoe & Johnson LLP

(57) ABSTRACT

A system, method, and related techniques are disclosed for scoring user responses to constructed response test items. The system includes a scoring engine for receiving a user response to a test question and evaluating the response against a scoring rubric. The scoring rubric may include a binding stage, an assertion stage, and a scoring stage. Furthermore, the system includes a database for referencing elements used by the scoring engine which may comprise objects, object sets, attributes of objects, and transformations of any elements.

9 Claims, 6 Drawing Sheets

```
<SelectObjectSet Type="OBJECTSET" Tag="S1">
        <Assert Function="NUMBEROFSIDES">
                <Param Name="Count" Value="0"/>
                <Param Name="Compare" Value="GT"/>
                <Param Name="Object" Value="@"/>
        </Assert>
</SelectObjectSet>

<Bind Type="INT" Tag="S1Count">
        <Function Name="GETCOUNT">
                <Param Name="Set" Value="$S1" />
        </Function>
</Bind>
```

FIG. 3

```
<Assert Name="FourObjects" Function="COMPAREINT"  BindMethod="FUNCTION">
      <Param Name="P1" Value="$S1Count"/>
      <Param Name="P2" Value="4"/>
      <Param Name="Compare" Value="EQ"/>
</Assert>

<Assert Name="FewerObjects" Function="COMPAREINT"  >
          <Param Name="P1" Value="$S1Count"/>
          <Param Name="P2" Value="4"/>
          <Param Name="Compare" Value="LT"/>
</Assert>

<Assert Name="FourGood" Function="COMPAREINT"  >
      <Param Name="P1" Value="$S3Count"/>
      <Param Name="P2" Value="4"/>
      <Param Name="Compare" Value="EQ"/>
</Assert>
```

FIG. 4

```
<Score Value="3">
        <And>
                <IsTrue Assertion="FourObjects"/>
                <IsTrue Assertion="FourGood"/>
        </And>
</Score>
<Score Value="2">
        <Or>
                <And>
                        <IsFalse Assertion="AllGood"/>
                        <IsTrue Assertion="FourGood"/>
                </And>
                <And>
                        <IsTrue Assertion="AllGood"/>
                        <IsTrue Assertion="ThreeGood"/>
                </And>
        </Or>
</Score>
```

FIG. 5

CONSTRUCTED RESPONSE SCORING MECHANISM

CROSS-REFERENCE TO RELATED APPLICATIONS

This application claims the benefit of U.S. Provisional Application No. 61/193,252 filed Nov. 12, 2008 and titled "Constructed Response Scoring Mechanism," which application is hereby incorporated by reference in its entirety for all purposes.

BACKGROUND

Learning often happens incrementally. At first students may be able to recall, recognize or name concepts. As mastery increases, they may be able describe concepts, the properties of concepts, or relationships among concepts. Eventually, students may be able to apply concepts to novel situations, use learned material to generate new insights, or synthesize learned material. This learning sequence is often referred to as "depth of knowledge," and refers to the depth with which students understand the material that they are taught. The specific stages and levels of depth vary across taxonomies, but the general idea is that knowledge becomes deeper and more internalized with additional mastery, and that in turn allows more robust application of the knowledge.

When assessing student mastery, it is often desirable to evaluate their depth of knowledge. From the perspective of test developers it can be quite difficult to develop selected response items (test questions) that measure deeper levels of knowledge. A selected response item is a test question, such as a multiple choice question, in which the correct answer is selected from a collection of choices.

Many testing programs use constructed response items to measure content at deeper levels of knowledge. A constructed response item is an item that does not offer the examinee answer options from which to choose, but rather the examinee must construct a response.

In a typical system, each student's response is evaluated against a scoring rubric, which describes the characteristics of a response that should receive full credit. When partial credit is to be awarded, the characteristics of responses that receive some portion of the total overall score are also enumerated. For example, an item might award three points for full credit, and individually enumerate characteristics of imperfect responses that would warrant the award of two points, one point, and zero points.

The scoring rubric usually goes through a refinement process called rangefinding. In this process, samples of student responses (usually from a field test) are evaluated by a committee of subject matter experts with the goal of selecting sample responses exemplifying each score point to be awarded. It is not uncommon for the scoring rubrics to be refined during this process.

Using the refined rubric, human scorers apply the scoring criteria to score each examinee's response to the item. Typically, this process is monitored and managed, giving each scorer a number of pre-scored papers to evaluate whether they continue to apply the rubric correctly, and having a proportion of scored papers independently scored by a second scorer to monitor the reliability with which scorers apply the rubric.

The current process has several limitations. First, it is very expensive to score constructed response items by hand, requiring that each response be read by one or more qualified scorers. Furthermore, the process by which scoring rubrics are refined does not offer an opportunity for large-scale evaluation of the consequences of the refinements, risking potential unintended consequences. Additionally, the process necessarily takes time, limiting the usefulness of constructed response items in online tests. For example, adaptive online tests use the scores on items administered early in the test to select the best items to administer later. Due to current limitations, human scoring prevents using constructed response items to support adaptive testing.

SUMMARY

Presented is an invention directed towards systems and methods that improve the current process for administering and scoring constructed response items. These systems and methods, used separately or together, allow for the immediate score of constructed response items. The invention has the practical benefits of reducing costs of administering constructed response items, providing more reliable scoring constructed response items, broadly validating constructed response scoring rubrics, and allowing for the integration of constructed response items into computerized adaptive tests delivered online or at testing centers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein:

FIG. 3 illustrates exemplary binding statements used in the binding stage according to an embodiment of the invention.

FIG. 4 illustrates exemplary assertions according to an embodiment of the invention.

FIG. 5 illustrates an exemplary snippet from a scoring specification for a three-point item according to an embodiment of the invention.

DETAILED DESCRIPTION

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic mediator other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
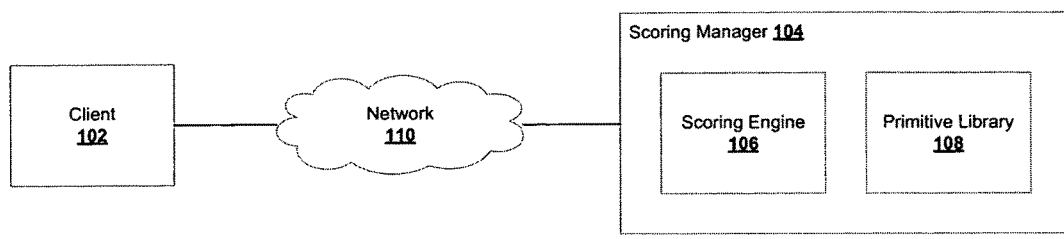
FIG. 1 is a block diagram of an embodiment of an exemplary system for implementing the invention.

FIG. 1 is a block diagram of an embodiment of an exemplary system 100 for implementing the invention. The system 100 includes components such as client 102, scoring manager 104, scoring engine 106, and primitive library 108. Each component includes a communication interface. The communication interface may be an interface that can allow a component to be directly connected to any other component or allows the component to be connected to another component over network 110. Network 110 can include, for example, a local area network (LAN), a wide area network (WAN), cable system, telco system, or the Internet. In an embodiment, a component can be connected to another device via a wireless communication interface through the network 110.

Client 102 may be or can include a desktop computer, a laptop computer or other mobile computing device, a network-enabled cellular telephone (with or without media capturing/playback capabilities), a server, a wireless email client, or other client, machine or device, or any combination of the above, to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device, or any combination of the above.

Scoring manager 104 is utilized for administering and scoring constructed response items for a user. The scoring manager 104 may also be utilized to generate individual expert systems to represent the scoring knowledge for a single constructed response item. The scoring manager 104 additionally may be configured to refine each expert system and test it against a broad range of student responses. In an embodiment, scoring manager 104 is a server external to client 102. In another embodiment, scoring manger 104 may be an application that resides and is executable within client 102.

As shown, scoring engine 106 and primitive library 108 are components that reside within scoring manager 104. In other embodiments, one or more of the scoring engine 106 and primitive library 108 may be external to the scoring manager 104. The scoring engine 106 is a component that receives a user's response to a question and evaluates the response against a scoring rubric. The scoring engine 106 may include or have access to the library of primitives 108. In an embodiment, the primitive library 108 may include the calculation of distances, slopes, comparisons of strings and numbers, and other basic operations. In order to make the scoring engine 106 general so that it can support a very large range of items, the primitive library 108 may be low-level and higher order predicates may be created from the primitive library 108. In other embodiments, complex predicates may be added to the primitive library. In an embodiment, in using the primitive library 108, the language for representing a scoring rubric may enable the library functions to reference elements including, but not limited to, object sets, objects, attributes of objects, as well as transformations of any of these elements.

Figure 2:
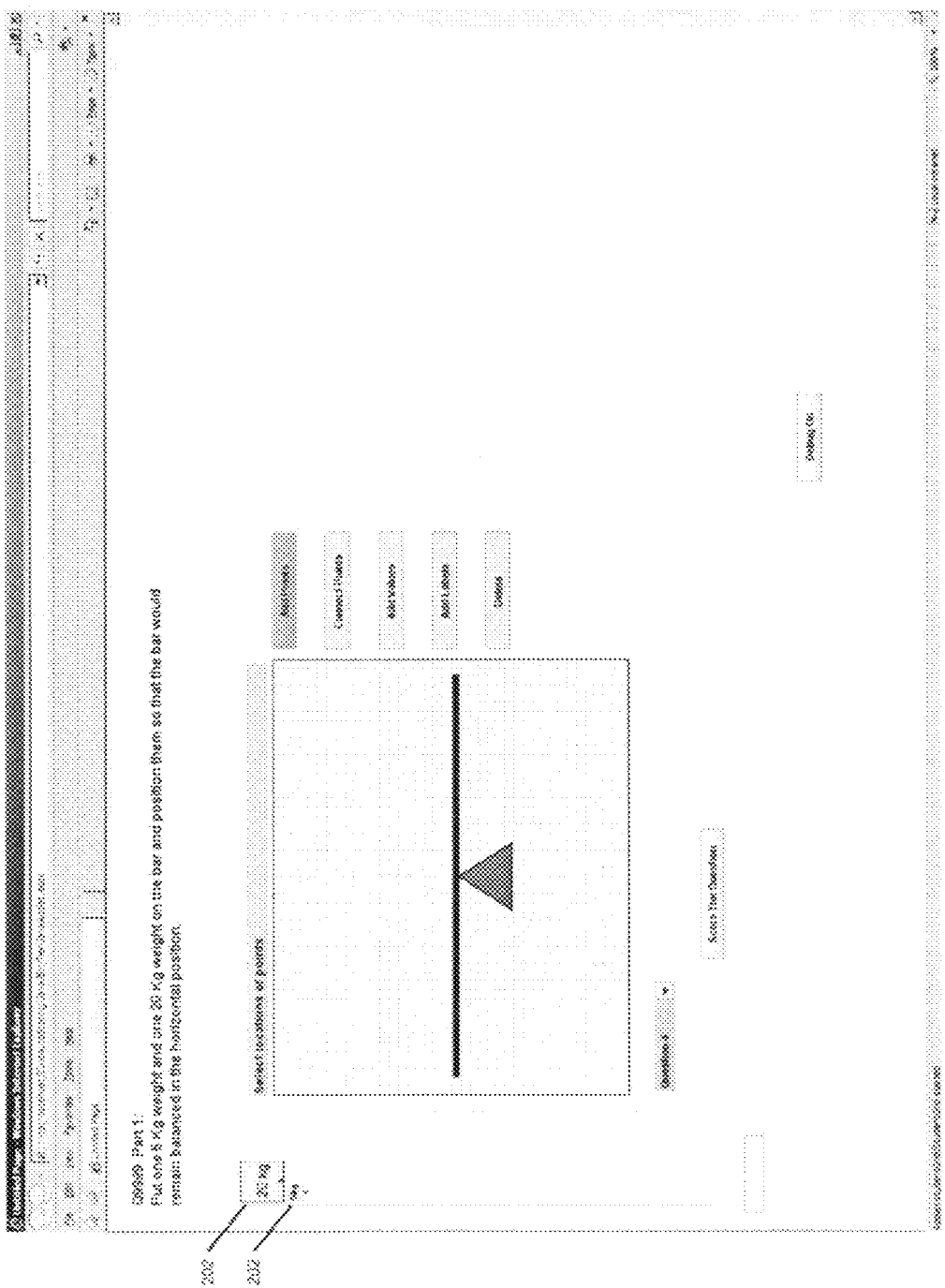
FIG. 2 is a screenshot of an exemplary user interface (UI) for collecting student responses according to an embodiment of the invention.

FIG. 2 is a screenshot of an exemplary user interface (UI) 200 for collecting student responses according to an embodiment of the invention. The UI 200 may be presented through an application that is part of the client 102 and/or the scoring manager 104. In an embodiment, through the UI 200, the invention uses items developed for user responses collected on a Cartesian grid to illustrate points. In other embodiments, the invention can be applied to user responses to other types of items using other response modes. In an embodiment, the UI 200 is referred to as an Interactive Grid (IG). A broad range of different item types can be presented in the IG.

The UI 200 may be used to ensure that user responses are collected with a consistent mechanism that creates and transmits a data structure to a scoring engine. A user response may comprise a set of objects, each of which may have one or more attributes. For example, the UI can produce a collection of objects that may include points, line segments connecting points, geometric objects comprised of connected line segments, and user-defined atomic objects, such as the weights 202 on the left palette in FIG. 200. Each object may be characterized by an ordered set of points. For example, the lines on the bottom-center of the weights 202 may be an example of an ordered set of points. In an embodiment, the UI 200 can return a data structure containing these objects to the scoring engine 106. In an embodiment, objects have properties that include, but are not limited to, locations, names, labels, and values.

In another embodiment, the UI 200 can be configured to capture natural language where the object set may include elements of a semantic network derived from a parse of the text provided by the user. Alternatively, the UI 200 can be configured to capture input from an equation editor representing sequences of symbols as the initial set of objects. Moreover, in other embodiments, an application to test proficiency with a computer program may capture menu commands, keyboard input, or mouse events as the set of objects. However, this list is intended to be exemplary rather than exhaustive.

In an embodiment, a scoring rubric may be defined in three sequential stages: a binding stage, in which references to elements are established; an assertion stage, in which assertions about elements are evaluated and stored; and a scoring stage, in which a score is assigned based on the values of the results of the assertions. XML-based language may be used for implementing these stages for the UI responses.

FIG. 3 illustrates exemplary binding statements used in the binding stage according to an embodiment of the invention. FIG. 3 presents two exemplary binding statements. The first, "SelectObjectSet" binds a subset of the input set to the variable "S1." The first binding statement collects all of the objects that have at least one side (NUMBEROFSIDES GT 0). The symbol "@" is bound sequentially to each object in the input set. The second statement in FIG. 3, "Bind," creates an additional binding, associating the symbol "S1Count" with the number of elements contained in set "S1." The symbol "$" dereferences the previously bound variable "S1."

An assertion is a predicate that is either true or false. The assertion further is an atomic unit from which scoring rubrics can be built. Each assertion can be named for later reference in the scoring stage. FIG. 4 illustrates exemplary assertions according to an embodiment of the invention. In FIG. 4, the first two assertions dereference the previously bound integer "S1Count" and assert that it is (respectively) equal to four and less than four. These assertions are named by the user, for example, "FourObjects" and "FewerObjects." The third assertion references another previously bound integer, which is the count of objects in another set meeting some other set of conditions. In this example, the third assertion is named "FourGood" and is true if the value of "S3Count" is 4.

In the scoring stage, named assertions are collected in a set of And-Or trees, one tree for each numeric score point. An exemplary snippet from a scoring specification for a three-point item appears in FIG. 5 according to an embodiment of the invention. In this case, full credit is assigned if there are four objects represented and all four meet whatever criteria was used to construct set "S3," and thus leading to the bound variable "S3Count" above.

The representation of annotated And-Or trees is well known in the computer science art. In an embodiment, the internal representation used is a set of nodes, in which each node has a list of children, each of which can be an And node, an Or node, or an assertion node. The resulting internal representation of the binding, assertion, and scoring trees comprises an Answer Set that includes an expert system embodying the knowledge of the scoring rubric for a particular item. The scoring rubric may be written directly in the specification language or authoring tools may be developed to help test developers specify the rubrics. In some embodiments, tools may be domain specific.

Figure 6:
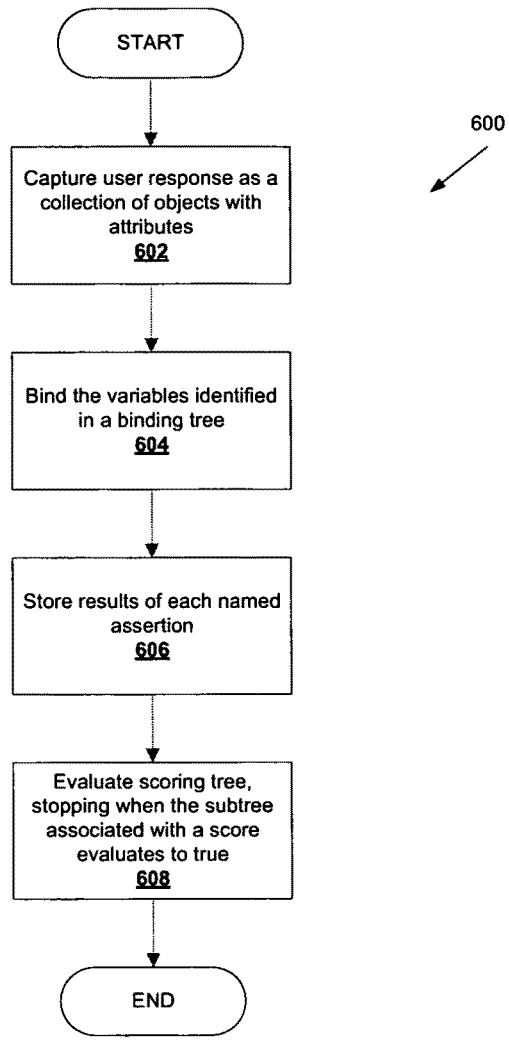
FIG. 6 is a block diagram of an exemplary method for scoring user responses according to an embodiment of the invention.

FIG. 6 is a block diagram of an exemplary method 600 for scoring user responses according to an embodiment of the invention. In an embodiment, the three-stage Answer Set is applied to the set of elements returned by the UI. One practical value of method 600 is that this process facilitates the use of a low-level library of primitives which can reduce or eliminate the need for any programming when defining a very broad range of new items or item types. In an embodiment, method 600 can integrate the assertion and scoring stage into one stage.

At operation 602, a user response is captured as a collection of objects with attributes. In an embodiment, the response is captured through a UI such as UI 200 (FIG. 2). At operation 604, a component binds the variables identified in a binding tree. In an embodiment, the component is a scoring engine such as scoring engine 106 (FIG. 1). At operation 606, results (true or false) are stored for each named assertion. At operation 608, starting with the highest possible score, a scoring tree is evaluated, stopping when the subtree associated with a score evaluates to true.

The disclosed invention also presents an enhanced method of "rangefinding" which refines expert systems and tests them against a broad range of student responses. Rangefinding is a committee process in which subject-matter experts agree on appropriate scores for sample examinee responses. During rangefinding, a small sample of items, often in the range of 25-100, are reviewed by committees to test the application of the scoring rubrics. During this process, refinements are made to the rubric, and sample papers are selected to train scoring staff on the accurate scoring of responses to the item.

However, improvements are needed for enhancing the rangefinding process. The invention provides such improvements. For example, through the invention, decisions of the rangefinding committee can be expressed formally as assertions in the language used to define the scoring rubrics. Formalizing the committee results as a series of explicit rules improves the accuracy of scoring, and would likely lead to more reliable scoring even when scoring is done by human scorers. Furthermore, committee decisions can be systematically tested against the full set of field-test data to locate unintended consequences of the proposed new rules.

Figure 7:
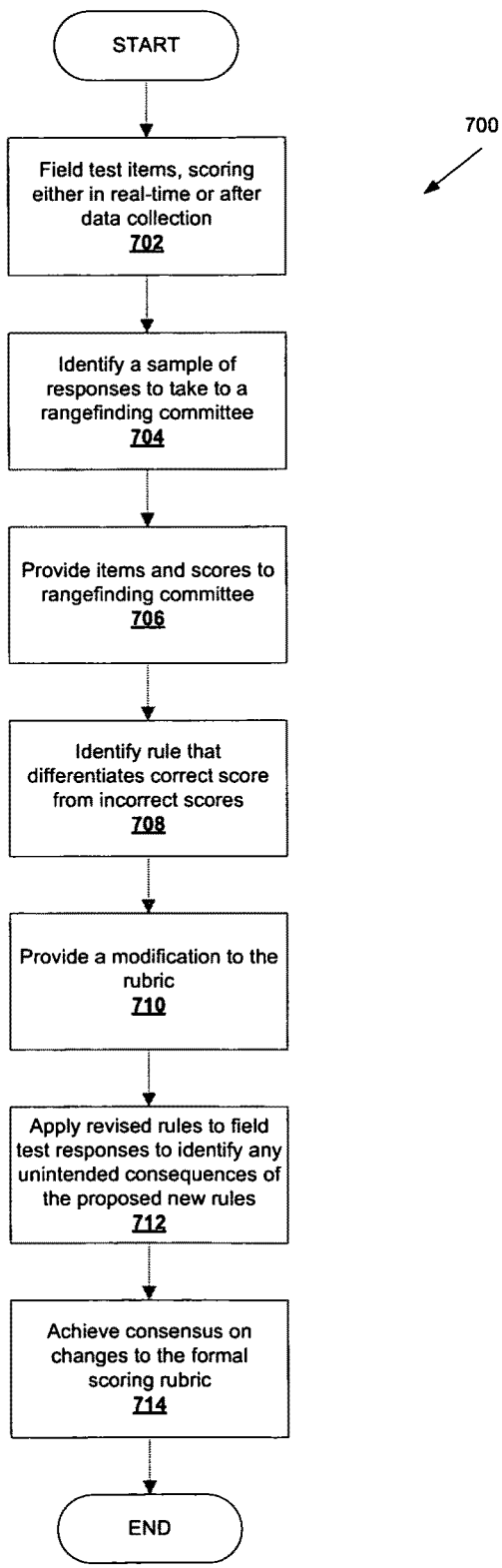
FIG. 7 is a block diagram of an exemplary method for refining a scoring rubric according to an embodiment of the invention.

FIG. 7 is a block diagram of an exemplary method 700 for refining a scoring rubric according to an embodiment of the invention. At operation 702, items are field tested and are scored either in real time or after data collection. At operation 704, a sample of responses are identified for transmission to a rangefinding committee. In an embodiment, the sample of responses may be selected by combing a small random sample with student responses selected to represent the work of otherwise high- or low-performing students. This may be done because otherwise high-performing students may score poorly on the item, or otherwise low-performing students may score well on the item.

At operation 706, items and corresponding scores are provided to the rangefinding committee. In an embodiment, the rangefinding committee is trained in the formal specifications of the scoring rubric. In instances where the committee reaches a consensus that a score is incorrect, at operation 708, one or more rules or principles are identified that differentiates the correct score from the incorrect scores. At operation 710, a modification to the scoring rubric, corresponding to the identified rules, is provided.

At operation 712, the identified rules for modifying the scoring rubric are applied to field test responses in order to identify any unintended consequences of the new rules. In an embodiment, this may be done by identifying scores that changed under the new rules and evaluating those changes. At operation 714, a consensus on whether to fully implement the new rules is achieved based on the modification to the formal scoring rubric. In an embodiment, the consensus is achieved after the committee reviews a new sample of responses for which the revision resulted in a change of scores and determines that the changes are limited to those intended.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A system for scoring user responses to a test question, comprising:
   a scoring engine for receiving a user response to a test question and evaluating the response against a scoring rubric, wherein the scoring rubric includes a binding stage, an assertion stage, and a scoring stage; and
   a database for referencing elements used by the scoring engine which include at least one of objects, object sets, attributes of objects, and transformations of any elements;
   wherein the system establishes at least one reference to one or more elements during the binding stage;
   the system evaluates and stores at least one assertion about an element during the assertion stage;
   the system builds a scoring rubric based on said assertions;
   the system assigns a score to the response based on a result produced at the assertion stage during the scoring stage; and
   the bindings and the assertions use a library of relatively low-level primitives that are combined to score an array of item and item types without the need for additional programming.

2. The system of claim 1, wherein the user response includes one or more objects comprising at least one of points, line segments connecting points, geometric objects comprised of connected line segments, and user-defined atomic objects.

3. The system of claim 2, wherein the objects are characterized by an ordered set of points.

4. The system of claim 2, wherein the objects have properties including at least one of locations, names, labels, and values.

5. The system of claim 1, wherein the at least one assertion is a predicate that is either true or false.

6. The system of claim 1, wherein named assertions are collected in a set of And-Or trees.

7. The system of claim 6, wherein there is one tree for each numeric score point.

8. The system of claim 1, wherein the user response includes one or more objects comprising natural language text, wherein the natural language text is parsed to yield an object subset in the binding stage.

9. The system of claim 1, wherein the user response includes one or more objects.

* * * * *